United States Patent [19]

Funakoshi et al.

[11] 4,379,617
[45] Apr. 12, 1983

[54] REAR PROJECTION SCREEN FOR A COLOR TELEVISION PROJECTOR

[75] Inventors: Yasutomo Funakoshi, Sakai; Tamotsu Wakahata, Katano, both of Japan

[73] Assignee: Matsushita Electric Industrial Company, Limited, Osaka, Japan

[21] Appl. No.: 251,903

[22] Filed: Apr. 7, 1981

[30] Foreign Application Priority Data

Apr. 8, 1980 [JP] Japan .................................. 55-46392
Apr. 8, 1980 [JP] Japan .................................. 55-46393

[51] Int. Cl.³ .............................................. G03B 21/60
[52] U.S. Cl. .................................... 350/126; 350/128
[58] Field of Search ....................... 350/127, 128, 126; 358/225

[56] References Cited

U.S. PATENT DOCUMENTS 2,268,351 12/1941 Tanaka ................................. 350/128
3,846,012 11/1974 Brown ................................. 350/128

Primary Examiner—Richard A. Wintercorn
Attorney, Agent, or Firm—Lowe, King, Price & Becker

[57] ABSTRACT

In a rear projection screen for a color television projector, having a plurality of lenticular lenses on one surface thereof, the contour of the cross-section of each lenticular lens is simply formed of a pair of linear portions and an arcuate portion interposed between the pair of linear portions. Thus, a mold for manufacturing the screen can be simply and readily machined so as to provide low cost screens, while the picture on the screen looks satisfactorily when viewed from various view points throughout a wide angle.

14 Claims, 9 Drawing Figures

REAR PROJECTION SCREEN FOR A COLOR TELEVISION PROJECTOR

BACKGROUND OF THE INVENTION

This invention generally relates to a screen on which a color picture is projected by means of a color television projector having red, green and blue light emitting tubes. More particularly, the present invention relates to such a screen of the type arranged to pass the light beams from the light emitting tubes applied to the screen from one side thereof to the other side, where the three light emitting tubes are arranged in-line.

As shown in FIG. 1, in some conventional projecting systems of this sort, three color light beam sources, namely, red tube 1, a green tube 2 and a blue tube 3 are arranged in line on a horizontal axis (not shown) with a given interval therebetween. Each of the tubes emits a light beam of a specified color, i.e. red, green and blue, to project a picture on a screen 4, where the three tubes are oriented to a given point A on the screen. With this arrangement, three pictures of different colors are superimposed on another at the screen so as to form or reproduce the original color picture thereon.

The reference numerals 1', 2' and 3' indicate the directivity patterns of light beams from the respective tubes 1, 2 and 3. In the case that the directivety of each color beam is very sharp, the picture on the screen partially looks bluish or reddish depending on the difference in the intensity of the light beams when a viewer moves to a point B or C because the light beam emitting tubes 1 and 3 have given angles with respect to a center axis X which is perpendicular to the screen 4.

In some of conventional screens of this sort, lenticular lens arrangement is formed on one surface of the screen. Namely, a number of elongate strips, whose transverse cross-section takes a semicircular shape, are successively formed on one surface of the screen.

The inventors of the present invention have made various researchs so as to find a way for removing the above-mentioned disadvantage or drawback inherent to the conventional screens. It has been found by the inventors, as a result, that if the cross-section of each lenticule element constituting the lenticular lens arrangement of the screen were so shaped that each dome-like shape of the cross-section is formed of a complex curve of a quadratic or higher order function, the conventional problem would be removed in theory. However, this method is not practical because it is very troublesome and also difficult to manufacture a mold for forming the screen. Namely, if it is intended to manufacture a screen having such a lenticular lens arrangement on the surface thereof, a cutter blade for forming such a complex curve has to be manufactured first in accordance with a complex program obtained as a result of various calculations. Then the cutter blade has to be precisely controlled to form a given shaped mold so as to produce a screen. It is obvious in view of nowaday machining technique that such a fine machining of the cutter blade as well as the mold is nonpractical, while such a way of manufacturing the screen results in a high manufacturing cost. The inventors has continued research, and finally found a simple shape of the cross-section of each lenticule element, so that a corresponding mold can be readily manufactured by simple machining, while the conventional problem in connection the above-mentioned bluish or reddish picture depending on the view point has been eliminated.

SUMMARY OF THE INVENTION

It is, therefore, an object of the present invention to provide a new and useful rear projection screen for a color television projector, with which screen television pictures can be satisfactorily seen from various view points in front of the screen.

The feature of the present invention resides in the cross-sectional shape of each of lenticule elements which constitute a lenticular lens arrangement of the screen. Briefly describing the cross-sectional shape, the contour of a dome-like shape of each lenticule element is formed of a pair of linear portions and an arcuate portion interposed between the pair of linear portions.

In accordance with the present invention, there is provided a light-transmitting type screen for a color television projector, comprising: (a) a body in the form of a sheet made of a transparent synthetic resin; and (b) a plurality of lenticular lenses integrally formed with said body, said plurality of lenticular lenses are arranged in parallel on one surface of said sheet, each of said plurality of lenticular lenses having a cross-section the contour of which is formed of a pair of linear portions and an arcuate portion interposed between the pair of linear portions.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE PREFERRED EMBODIMENTS

Prior to describing the preferred embodiments of the present invention, the generic concept of the invention will be described for a better understanding of the invention.

Figure 3:
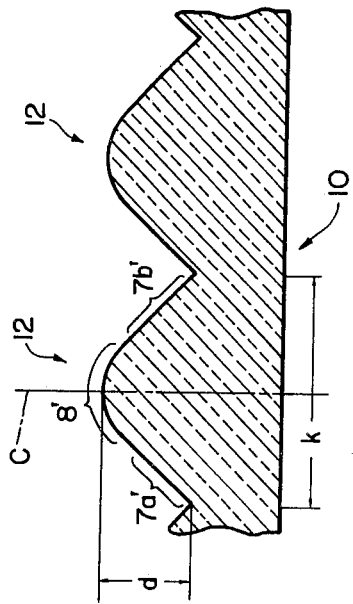
FIG. 3 is a schematic cross-sectional view of a molding formed by the mold of FIG. 2, which molding corresponds to an embodiment of the present invention.

According to the present invention, in a lenticular lens type screen, the cross-sectional shape of each lenticular lens is formed of a pair of linear portions and an arcuate portion interposed between the linear portions. In detail, assuming that a rectangular screen is formed, one surface of the screen is made substantially flat, while the other surface has a number of lenticular lenses arranged in parallel. Namely, the lenticular lenses are arranged in the form of stripes on one surface of the screen. The stripes of lenticular lenses are vertically arranged, and therefore, the cross-section taken along a horizontal line has a flat line at one side and a plurality of dome-like or U-shaped projecting portions as shown in FIG. 3. The light beams from red, green and blue light sources or light emitting tubes are applied to the screen via one surface thereof, to form and reproduce a picture of given colors thereon, while the picture is viewed from the other side of the screen by viewers.

As is described in the above, FIG. 3 is a cross-sectional partial view of an embodiment of the screen according to the present invention, and the way of manufacturing the same will be described with reference to FIG. 2 which is a cross-sectional partial view of a mold for manufacturing the screen. The mold, which is generally designated at a numeral 5, is made of a brass plate, and this brass plate is machined so that a number of recessed strips for forming lenticular lenses are made on one surface of the screen. A single lenticular lens among a plurality of parallel lenticular lens stripes will be referred to as a lenticule element hereinbelow, and is designated at a numeral 12 in FIG. 3. A number of parallel lenticule stripes are made successively without space therebetween, and the orientation of the lenticular lens stripes is of the vertical direction of the screen on which light beams of different colors, i.e. red, green and blue, are applied from different projecting tubes aligned in line which is parallel to the horizontal direction of the screen.

Now the shape of each lenticule element 12 will be described with reference to the cross-sectional view of the mold 5 of FIG. 2. A portion of the cross-section of the mold 5 corresponding to each lenticule element 12 is designated at 20 and has a pair of linear portions 7a and 7b and an arcuate portion 8 interposed between the linear portions 7a and 7b. The arcuate portion 8 may correspond to a part of a circle (not shown) having a given radius. Between two adjacent recessed portions 20 and 20' is a vertex 22. The distance between two adjacent vertexes 22 and 22' is expressed in terms of k, and this length k is referred to as a pitch of the lenticular lens arrangement. The pitch k corresponds to the projecting length or width of each lenticule element 12. The length of each of the linear portions 7a and 7b and the length of the arcuate portion 8 are all expressed by way of lengths respectively measured in the same direction as the pitch k, namely in the direction parallel to a line p passing through the vertexes 22 and 22'. The length of each of the linear portions 7a and 7b measured along in this direction is indicated at a reference m, while the length of the arcuate portion 8 is indicated at a reference n. The arcuate portion of each lenticule 12 of FIG. 3, corresponding to the arcuate portion 8 of the mold 5 of FIG. 2 is designated at a reference 8', while the linear portions of each lenticule 12 of FIG. 3, corresponding to the linear portions 7a and 7b of the mold 5 are respectively designated at references 7a' and 7b'. The lengths m and n respectively correspond to projecting lengthes or widths or the linear portions 7a' and 7b' and the arcuate portion 8' of the lenticule element 12 of the screen. The length n also corresponds to the chord of the arcuate portion 8 or 8'.

Figure 2:
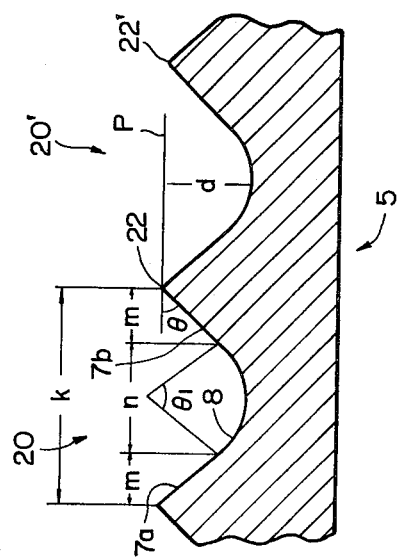
FIG. 2 is a schematic cross-sectional view of a mold for manufacturing a lenticular lens type screen according to the present invention.

In the mold 5 of FIG. 2, the pitch k, i.e. the projecting length of each lenticule element 12 of FIG. 3, is 0.5 millimeter, the projecting length m of each of the linear portions 7a (7a') and 7b (7b') of each element 12 is 0.14 millimeter, the projecting length n, i.e. the chord of the arcuate portion 8 (8') is 0.22 millimeter. The linear portions 7a (7a') and 7b (7b') respectively have a given inclination angle $\theta$ with respect to the line p, and this angle $\theta$ in this embodiment is 40 degrees. The arcuate portion 8 (8') is a part of a circle, and a center angle $\theta_1$ of a sector defining the arcuate portion 8 (8') is 63 degrees. The depth d of the recessed portion 20, namely, the distance between the vertex 22 and the bottom of the arcuate portion 8, is 0.15 millimeter. This depth d corresponds to the height, also indicated at a reference d, of each lenticule element 12 of FIG. 3.

Since each of the recessed portions 20, 20' . . . is simply defined by a pair of linear portions 7a and 7b and an arcuate portion 8, the recesses 20, 20' . . . may be readily formed. There are basically two different ways for forming these recesses 20, 20' . . . on one surface of the brass plate for providing a desired mold. One method is to use a cutter blade having a given shape corresponding to the above-described shape of the recess 20. Namely, such a cutter blade is used to machine the surface of a brass plate by either rotating the cutter blade or fixing the same stationary. The other method is to make a spherical hole first on a brass plate so as to provide the arcuate portion 8, and then to cut off or scrape off both sides of the spherical hole so as to provide the linear portions 7a and 7b.

After a number of recessed portions 20, 20' . . . have been formed on one surface of the brass plate to complete the mold of FIG. 2, the surface of the mold is coated with nickel to the thickness of approximately 2 micrometers. Since it is desirable that the thickness of the coating is constant throughout the surfaces of the plurality of recesses 20, 20' . . . , chemical plating is adopted. On the mold 5 is placed a number of synthetic resin pellets of polymethyl methacrylate, where each of the pellets has a length of approximately 0.5 to 3.0 millimeters, a diameter of approximately 0.5 to 2.0 millimeters, and a refractive index of 1.492. Then the mold 5 as well as the pellets is heated well up to approximately 150 to 200 degrees centigrade. Nextly, the mold 5 is put in a device which is capable of applying pressure, so that pressurizing and depressurizing are repeated several times within a range of approximately 10 to 200 Kg/cm$^2$ for letting the air out of molten material in the cavity of the mold 5. Nextly, pressurizing is effected within a range of 50 to 200 Kg/cm$^2$ to confirm that the pellets are filled in the mold 5 throughout the entire surface thereof, and then quench hardening is effected under the condition of pressurizing. When the temperature of the molding becomes approximately 40 to 70 degrees, centigrade the molding is taken out of the mold 5 so that a molded article 10, as shown in FIG. 3, is obtained.

Although only two lenticule elements 12 are shown in the cross-sectional partial view of FIG. 3, actually there are a great number of lenticule elements 12 on one surface of the screen which takes a form of a sheet. Namely, assuming that the shape of the entire screen is rectangular, and its width is 1 meter, two thousands of lenticule elements 12 are formed in this embodiment.

The cross-section of each lenticule element 12 is symmetrical with respect to a center line c perpendicular to the screen sheet. One surface opposite to the surface having the lenticule elements 12 is made substantially flat as shown in FIG. 3. This flat surface may be made rough if desired for improving the vertical light-dispersing characteristic of the screen. In practical use, suitable color light beams may be applied to either the flat surface so that the picture on the screen is seen from the other side, i.e. the side of lenticular lens arrangement, or to the surface of lenticular lens arrangement so that the picture on the screen is seen from the side of the flat surface.

The above-mentioned various sizes and angles may be changed so as to provide a screen having lenticular lens arrangement of different size from the above-described first embodiment. Namely, as a second embodiment of the screen of the present inventon, the projecting length k, i.e. the pitch, of one lenticule element 12, is 0.75 millimeter, the inclination angle $\theta$ of each of the linear portions 7a' and 7b' is 40 degrees, the center angle $\theta_1$ of the arcuate portion 8' is 63 degrees, the length n of the chord of the arcuate portion 8' is 0.25 millimeter, and the height d of each lenticule element 12, is 0.25 millimeter. In order to produce such a screen of the above-described second embodiment, a corresponding mold (not shown) is first provided in the same manner as described above.

Although it has been described that the lenticular lens arrangement is formed by way of molding technique using a given corresponding mold, such a lenticular lens arrangement may be manufactured by using a pair of cylindrical rollers (not shown). In detail, one of the cylindrical rollers is machined in such a manner that a plurality of given recesses are formed on the surface thereof in its longitudinal direction, while the other roller has a smooth surface. Then a synthetic resin, which has been heated up to a given temperature so that the resin is deformable, is passed through a space between the rollers. As a result, a screen having a flat surface at one side and a surface with a plurality of lenticule elements at the other side is manufactured. The recesses on the surface of one of the rollers may be formed in the same manner as the recesses 20, 20' . . . of the mold 5 of FIG. 2

Figure 4:
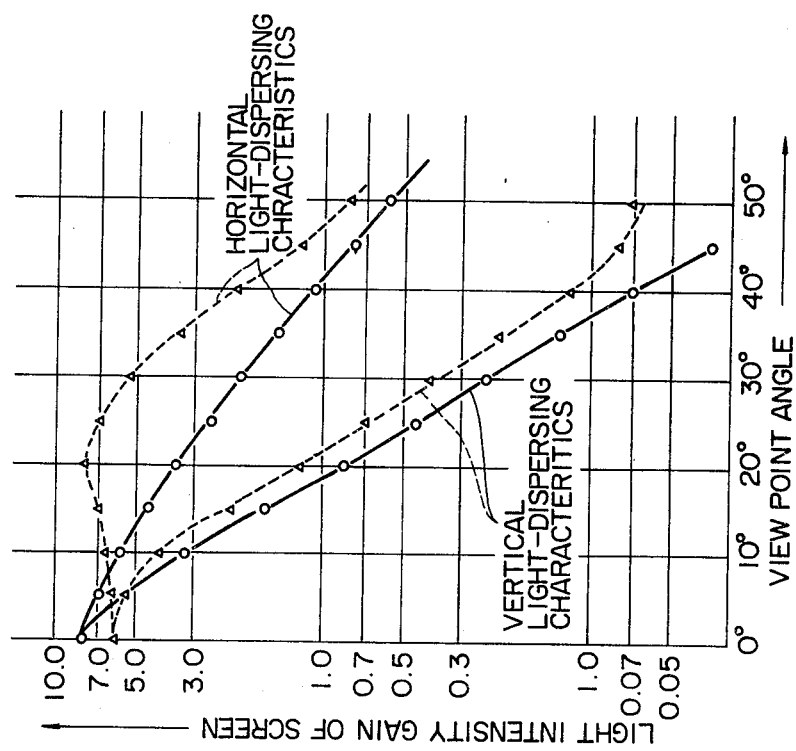
FIG. 4 is a graphical representation showing, by way of light intensity gain, the directivity of each color beam incident on the screen according to the present invention in comparison with the directivity of the same on a screen with a lenticular lens arrangement of different shape from a preferred embodiment of the present invention.

Reference is now made to FIG. 4 which shows light intensity gain of the screen according to the present invention with respect to the angles of viewing direction. In the graph of FIG. 4, two solid curves respectively indicate horizontal light-dispersing characteristic and a vertical light-dispersing characteristic of the above-mentioned first embodiment screen of FIG. 3. In addition to the gain curves of the screen according to the present invention, two dotted curves indicating horizontal light-dispersing characteristic and a vertical light-dispersing characteristic of a screen having similar but undesirable lenticular arrangement are shown. Namely, the dotted curves indicate the characteristics of a screen having a structure such that the projecting length k of one lenticule element 12, i.e. the pitch, is 0.75 millimeter, the inclination angle $\theta$ of each of the linear portions 7a' and 7b' is 40 degrees, the projecting length m of each of the linear portions 7a' and 7b' is 0.3 millimeter, the center angle $\theta_1$ of the arcuate portion 8' is 63 degrees, the length n of the chord of the arcuate portion 8' is 0.15 millimeter, and the height d of each lenticule element 12 is 0.27 millimeter.

Figure 5:
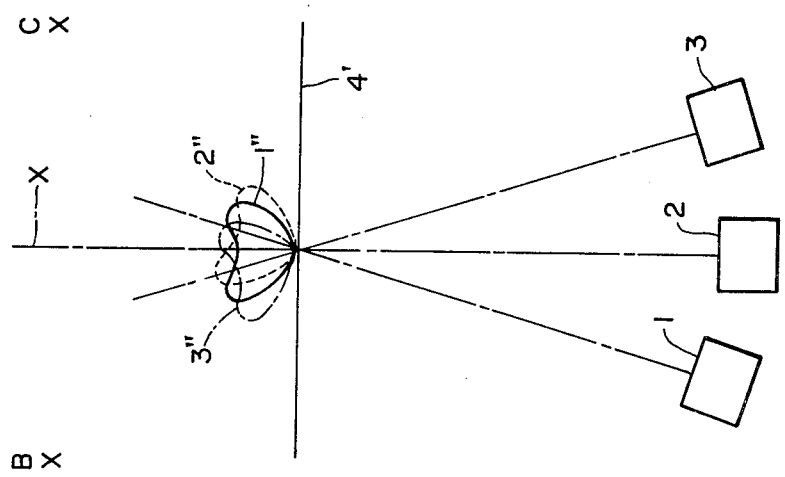
FIG. 5 is an explanatory view showing the directivity patterns of repective light beams incident on the screen with a lenticular lens arrangement which is different from a preferred embodiment of the present invention.

As is indicated by the dotted curve representing the horizontal light-dispersing characteristic of the above-mentioned screen, it has been found by the present inventors that the light intensity gain of the screen measured at a point on a center axis perpendicular to the screen (see zero degree intensity of FIG. 4) is lower than that at a point on other than the center axis (see 20 degree intensity for instance) because the projecting length m of each of the linear portions 7a' 7b' exceeds one third the projecting length k of each lenticule element 12. In other words, when the cross-section of each lenticule element 12 is arranged such that the projecting length m of each of the linear portions 7a' and 7b' is greater than one third the pitch k, the highest intensity appears at two points on axes deviated from the center axis, i.e. zero degree, by a given angle such as 20 degrees. The directivity patterns of light beams through such an undesirable screen is shown in FIG. 5. Namely, each of the directivity of each of the color light beams from respective light sources 1, 2 and 3 is indicated by 1'', 2'', and 3'', and the shape of each directivity pattern, i.e. equiintensity curve, takes a form of heart.

From the above, it will be understood that the directivity characteristic curve inherent to a screen is basically determined by the proportion of the projecting length m of each of the linear portions 7a' and 7b' to the projecting length k of the lenticule element 12. In detail, the directivity is finally determined by adding the directivity of the curved or arcuate portion 8' to the directivity of the pair of linear portions 7a' and 7b' and therefore, if the projecting length m of each of the linear portions 7a' and 7b' is excessively long with respect to the pitch k, the amount of a light beam passing through the linear portions 7a' and 7b' is relatively greater than that through the arcuate portion 8'. As a result, the light intensity at a view point on other than the center axis X of the screen becomes undesirably higher than that at a view point on the center axis X.

Figure 1:
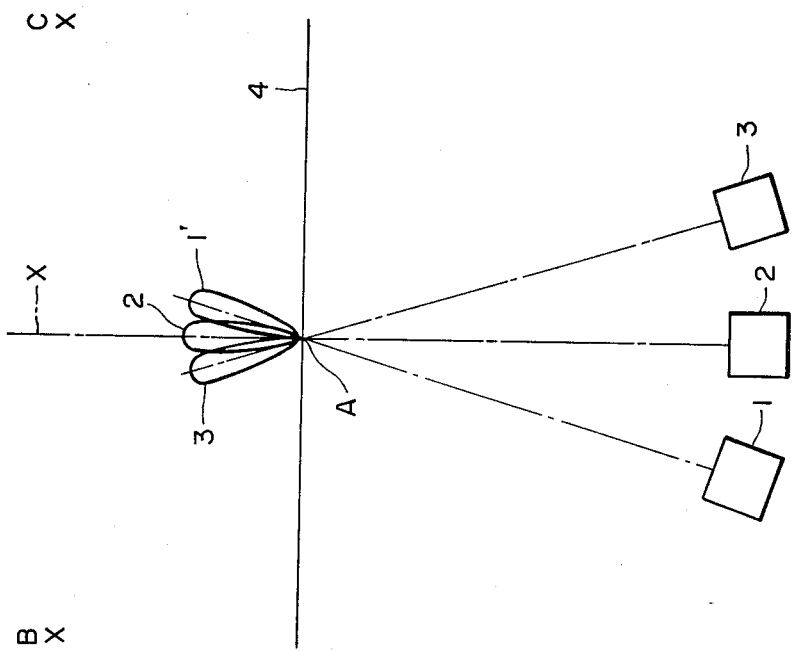
FIG. 1 is an explanatory view of a conventional projecting system having a screen of the type arranged to pass light beams therethrough.

On the other hand, if the projecting length m of each of the linear portions 7a' and 7b' is smaller than one third the pitch k, the directivity of each light beam through the screen tends to become too sharp in the same manner as in the conventional screen (see the directivity pattern of FIG. 1). As a result, when the picture on the screen is seen from a view point on other than the center axis X, the picture looks dark.

From the foregoing, it is concluded that the amount of a light beam passing through the screen in substantially constant throughout a wide angle if the projecting length m of one linear portion 7a', the projecting length n of the center arcuate portion 8', and the projecting length m of the other linear portion 7b' are in the ratios of 1:1:1. This condition is met by setting the projecting length m of each of the linear portions 7a' and 7b' to one third the pitch k as described with reference to FIGS. 2 and 3.

Figure 6:
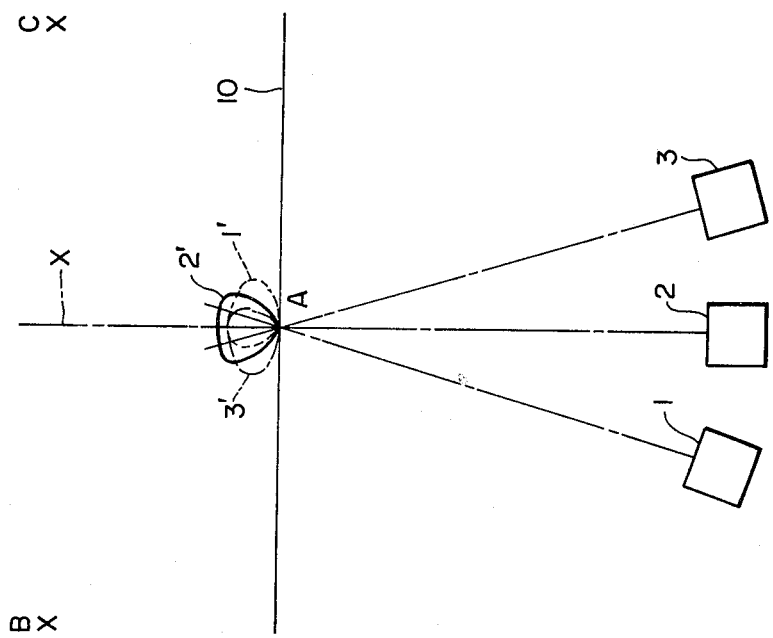
FIG. 6 is a view showing the directivity patterns of respective light beams incident on a screen according to the present invention.

FIG. 6 shows directivity patterns of light beams through the screen 10 according to the present invention. The directivity pattern of each light beam from each of the light sources 1, 2 and 3 is of obtuse angle as shown in FIG. 6. Accordingly, even when a picture on the screen 4 is seen from various view points, such as indicated at B and C, the picture looks properly and satisfactorily without looking bluish or reddish, while brightness of the picture is substantially constant throughout a wide angle of view points.

In the above first and second embodiments, although it has been described that the screen 10 is simply made of a synthetic resin, such as polymethyl methacrylate, other materials may be used while some additives may be added if desired as will be described hereinbelow.

Figure 7:
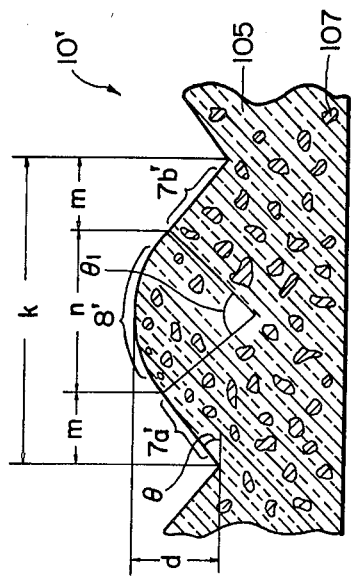
FIG. 7 is a schematic cross-sectional view another embodiment of the screen according to the present invention.

FIG. 7 shows a schematic cross-sectional view of a third embodiment of the screen according to the present invention. The third embodiment screen 10' is basically made of polymethyl methacrylate 105 whose refractive index is 1.492, where silicon oxide particles 107 is included at a ratio of 3.0 wt%. The refractive index of silicon oxide is 1.544, while average diameter of the silicon oxide particles 107 is 8.7 micrometer wherein the diameter is measured by air transmittance method. The way of manufacturing the third embodiment screen will be described in detail hereinbelow. First, the above-mentioned silicon oxide particles 107 are mixed with the above-mentioned polymethyl methacrylate at the above-mentioned ratio, and then pellets having average diameter of 1.0 millimeter are obtained by using an extruder. In this third embodiment, although no dispersing agent is used, a suitable dispersing agent, such as fatty acid (for instance, stearic acid, calcium stearate or the like) or metallic soap may be added, if necessary, at a ratio of 0.1 to 50 wt% with respect to the resin. The pellets obtained in the above-mentioned manner are put in a suitable mold in the same manner as described with reference to FIG. 2. The mold used for manufacturing the third embodiment screen is such that the pitch k is 0.5 millimeter, the inclination angle $\theta$ of each of the linear portions 7a' and 7b' is 40 degrees, the center angle $\theta_1$ of the arcuate portion 8' is 63 degrees (this angle may be within a range of 53 degrees to 70 degrees), and the height d is 0.12 millimeter. After the pellets are placed on the mold, a mirror-like plate (not shown) is put on the pellets, and then the pellets are heated in a heating apparatus (not shown) of the type arranged to either directly heat the pellets or to indirectly heat the same by the ambient air so as to heat the pellets up to approximately 170 to 200 degrees centigrade. Then the molten resin as well as the mold is moved to a press to pressurize the same with a pressure of approximately 50 to 150 Kg/cm$^2$. After the molding material has been sufficiently expanded, quench hardening is effected, and when the temperature of the mold becomes approximately 70 degrees centigrade, the mold is opened to take out the molding so as to obtain the screen 10'.

The above-mentioned inclination angle $\theta$ of each of the linear portions 7a' and 7b' has been obtained by:

$$\theta = \sin^{-1}(1/n)$$

wherein "n" is the refractive index of the resin used as the material of the screen, namely, n is the refractive index of polymethyl methacrylate in this embodiment.

The above formula is for obtaining a critical angle from the refractive index, and in practice the angle $\theta$ may be set to a value obtained by the following formula considering the machining accuracy.

$$\theta = \left[\sin^{-1}\left(\frac{1}{n}\right)\right]_{-6°}^{+0°}$$

Figure 8:
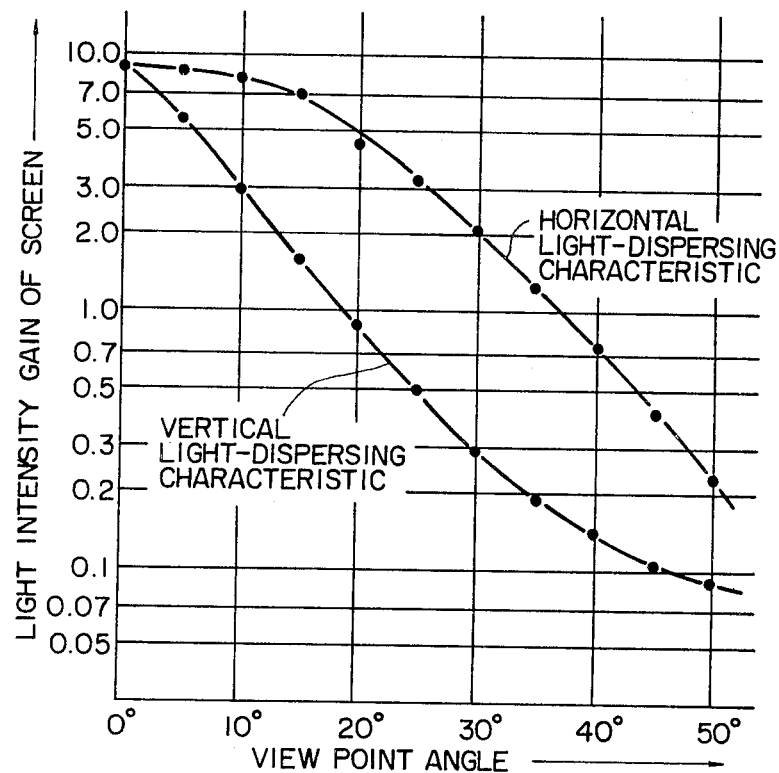
FIG. 8 shows typical directivity patterns of light beams incident on the screen according to the present invention.

The light beam intensity gain of the third embodiment screen with respect to view points of different angles is shown in a graph of FIG. 8.

A fourth embodiment screen is obtained in a similar manner to the above-described third embodiment. Namely, the center angle $\theta_1$ of the arcuate portion 8' of each lenticule element 12 in the fourth embodiment is set to approxomately 72 degrees, the pitch k is 0.75 millimeter, the inclination angle $\theta$ of each of the linear portions 7a' and 7b' is 40 degrees, and the height d is 0.251 millimeter.

A fifth embodiment of the screen according to the present invention is manufactured by using polystyrene while no light-dispersing agent is added thereto. In the fifth embodiment screen, the pitch k of one lenticule element is 0.75 millimeter, the inclination angle $\theta$ of each of the linear portions 7a' and 7b' is 38.97 degrees, the center angle $\theta_1$ of the arcuate portion 8' is 63 degrees, and the height d is 0.237 millimeter. The fifth embodiment screen is manufactured in the same manner as the first embodiment.

The resin material for forming the screen may be suitably selected from various resins. For instance polycarbonate may be used as the resin material, while no light-dispersing agent is added thereto. In this case, also the same molding technique as described in the above may be adopted. However, in the molding process, the heating temperature has to be selected to a desired one which is most suitable for the material.

The inclination angle $\theta$ of each of the linear portions 7a' and 7b' in each of the above-described embodiments have been set to be less than the total internal reflection angle which is defined by the refractive index of the material used for the screen as listed in the following table.

| MATERIAL FOR SCREEN | REFRACTIVE INDEX | TOTAL INTERNAL REFLECTION ANGLE |
|---|---|---|
| POLYMETHYL METHACRYLATE | 1.492 | 42.09° |
| POLYSTYRENE | 1.59 | 38.97° |
| POLYCARBONATE | 1.59 | 38.97° |

If the inclination angle $\theta$ of each of the linear portions 7a' and 7b' were greater than the total internal reflection angle, the light beams incident on the screen would be totally reflected at the front surface of the screen viewed from the side of viewers. As a result, no effective light beams come out of the screen resulting in very unclear and dark picture, while the quality of the picture is deteriorated. It can be imagined such a poor picture is not suitable to be seen in a light room. In accordance with the present invention, the inclination angle $\theta$ of each of the linear portions 7a' and 7b' in each lenticule element 12 has been set to an angle which is smaller than the total internal reflection angle defined by the material used for the screen, and therefore, the picture on the screen is very clear.

Figure 9:
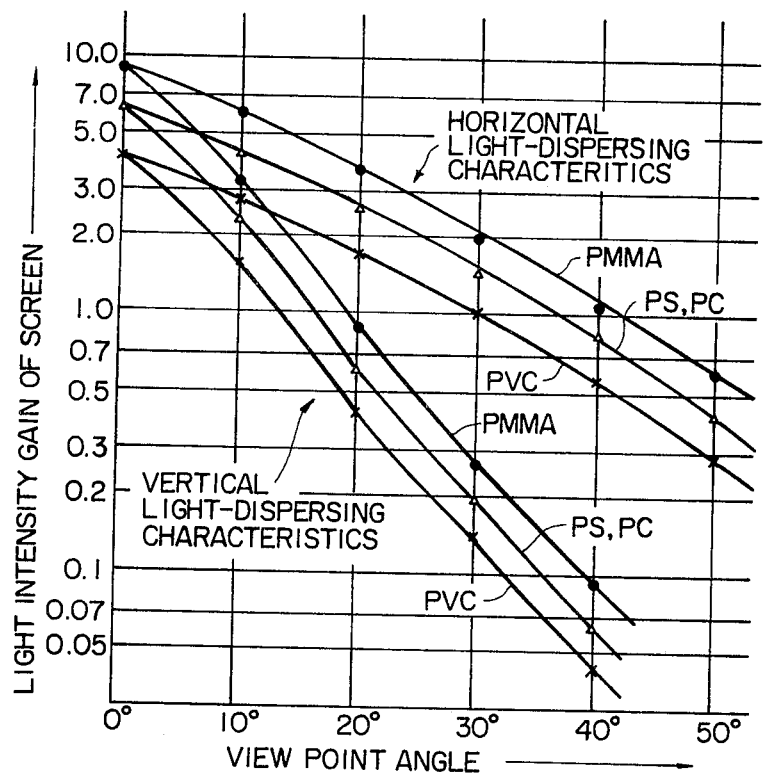
FIG. 9 is a graphical representation showing various light intensity gains of various screens made of different materials.

FIG. 9 is a graphical representation showing vertical and horizontal light-dispersing characteristics of various screens made of polymethyl methacrylate (PMMA), polstrene (PS), polycarbonate (PC) and polyvinylchloride (PVC). The light transmittance of PMMA is 93 percent, the same of PS and PC is 88 percent, and the same of PVC is 86 percent. As is seen in the graph of FIG. 9, when the light transmittance is below 88 percent, as in the case of PVC, the light intensity gain of the screen is very low. Therefore, such a material, the light transmittance of which is below 88 percent, is not suitable for a screen used in a light room of 500 luxes or so. In other words, the light intensity gain at zero degree should be over 6 for the use in such a light room. The light transmittance is inherent to the material of the screen, and therefore, it can be said that PMMA, PS and PC are preferable, and PMMA is most preferable.

The above-described embodiments are just examples of the present invention, and therefore, it will be understood for those skilled in the art that many modifications and variations may be made without departing from the spirit of the instant invention.

What is claimed is:

1. A rear projection screen for a color television projector, comprising:
   (a) a body in the form of a sheet made of a transparent synthetic resin; and
   (b) a plurality of lenticular lenses integrally formed with said body, said plurality of lenticular lenses being arranged in parallel on one surface of said sheet, each of said plurality of lenticular lenses having a cross-section the contour of which is formed of a pair of linear portions and an arcuate portion interposed between the pair of linear portions, each of said linear portions having an inclination angle with respect to said sheet that is less than a total internal reflection angle defined by the material of said lenticular lenses.

2. A rear projection screen for a color television projector, comprising:
   (a) a body in the form of a sheet made of a transparent polycarbonate; and
   (b) a plurality of lenticular lenses integrally formed with said body, said plurality of lenticular lenses being arranged in parallel on one surface of said sheet, each of said plurality of lenticular lenses having a cross-section the contour of which is formed of a pair of linear portions and an arcuate portion interposed between the pair of linear portions.

3. A rear projection screen for a color television projector, comprising:
   (a) a body in the form of a sheet made of a transparent synthetic resin including a light-dispersing agent; and
   (b) a plurality of lenticular lenses integrally formed with said body, said plurality of lenticular lenses being arranged in parallel on one surface of said sheet, each of said plurality of lenticular lenses having a cross-section the contour of which is formed of a pair of linear portions and an arcuate portion interposed between the pair of linear portions.

4. A rear projection screen as claimed in claim 1 or claim 2 or claim 3, wherein said cross-section is symmetrical with respect to a center line perpendicular to said sheet.

5. A rear projection screen as claimed in claim 1 or claim 2 or claim 3, wherein each of said linear portions has a picture-projecting length which is substantially equal to one third the width of each lenticular lenses.

6. A rear projection screen as claimed in claim 1 or claim 2 or claim 3, wherein each of said linear portions has an inclination angle with respect to said sheet, that is less than a total internal reflection angle defined by the material of said lenticular lenses.

7. A rear projection screen as claimed in claim 1 or claim 2 or claim 3, wherein said plurality of lenticular lenses are successively formed without any significant space therebetween.

8. A rear projection screen as claimed in claim 1 or claim 3, wherein said synthetic resin is polymethyl methacrylate.

9. A rear projection screen as claimed in claim 1 or claim 3, wherein said synthetic resin is polystyrene.

10. A rear projection screen as claimed in claim 1 or claim 3, wherein said synthetic resin is polycarbonate.

11. A rear projection screen as claimed in claim 1 or claim 2, wherein said synthetic resin includes a light-dispersing agent.

12. A rear projection screen as claimed in claim 3, wherein said light-dispersing agent is silicon oxide.

13. A rear projection screen as claimed in claim 1 or claim 2 or claim 3, wherein said sheen has a substantially flat surface at one side.

14. A rear projection screen as claimed in claim 13, wherein said flat surface is made rough.

* * * * *